(12) United States Patent
Zelley

(10) Patent No.: US 6,364,202 B1
(45) Date of Patent: Apr. 2, 2002

(54) EASY-OPENING COLLAPSIBLE CONTAINER

(75) Inventor: Richard M. Zelley, The Woodlands, TX (US)

(73) Assignee: Domco Tarkett Inc., Farnham (CA)

( * ) Notice: Subject to any disclaimer, the term of this patent is extended or adjusted under 35 U.S.C. 154(b) by 0 days.

(21) Appl. No.: 09/872,941

(22) Filed: Jun. 1, 2001

(51) Int. Cl.⁷ .............................................. B65D 17/32
(52) U.S. Cl. ..................... 229/236; 229/160.2; 229/925
(58) Field of Search ............................. 229/160.2, 236, 229/243, 925

(56) References Cited

U.S. PATENT DOCUMENTS

| | | | |
|---|---|---|---|
| 2,133,701 A | * 10/1938 | Holmes et al. | ............. 229/236 |
| 2,281,304 A | 4/1942 | Gillian | |
| 2,287,520 A | 6/1942 | Freshwaters | |
| 2,852,133 A | 9/1958 | Bonini et al. | |
| 2,981,456 A | * 4/1961 | Armstrong et al. | ......... 229/236 |
| 3,355,089 A | 11/1967 | Champlin | |
| 3,447,735 A | 6/1969 | Whitney | |
| 3,542,569 A | 11/1970 | Farquhar | |
| 4,279,933 A | 7/1981 | Austin et al. | ................ 426/124 |
| 4,344,537 A | * 8/1982 | Austin | ......................... 229/243 |
| 4,643,315 A | * 2/1987 | Hopwood et al. | .......... 229/236 |
| 4,877,673 A | 10/1989 | Eckel et al. | ................. 428/172 |
| 4,917,291 A | 4/1990 | Saiki et al. | .................. 229/155 |
| 4,944,407 A | * 7/1990 | Thiele et al. | ............ 229/160.2 |
| 4,946,042 A | * 8/1990 | Ferreri et al. | ................ 229/925 |
| 5,671,883 A | 9/1997 | Philips | |

\* cited by examiner

*Primary Examiner*—Gary E. Elkins
(74) *Attorney, Agent, or Firm*—Norris, McLaughlin & Marcus

(57) ABSTRACT

A cardboard container which can be easily opened without tools and which, when opened, collapses and lies flat without further handling to permit ready access to the container contents and which facilitates the recycling or disposal of the container.

8 Claims, 4 Drawing Sheets

EASY-OPENING COLLAPSIBLE CONTAINER

BACKGROUND OF THE INVENTION

1. Field of the Invention

The present invention relates generally to cardboard containers. More particularly the invention is directed to a unique cardboard container which can be easily opened without tools and which, when opened, collapses and lies flat without further handling to permit ready access to the container contents. Besides providing easy and complete access to its contents, the motivation to provide a collapsible container further resides in the desirability of a flat container configuration which can be easily recycled or readily disposed of after its contents have been removed without taking up unnecessary space in a solid waste receptacle. Although the container of the present invention has many different applications, it is described herein primarily as used for the containment of vinyl floor tiles.

2. Description of the Related Art

U.S. Pat. No. 5,671,883 to Philips dated Sep. 30, 1997 discloses a paperboard container that has high stacking strength but also has structural elements incorporated therein in order to permit collapsing of the container, after use, to a flat configuration for subsequent retrieval and recycling. More particularly the container disclosed by Philips incorporates weakened lines in two of its opposing endwalls. This feature permits a portion of the endwalls, upon the application of an outward force by the customer, to be disengaged from the rest of the assembled container and then, upon further handling by the customer, to cause the container to lie flat. Unlike the container disclosed by Philips, the present invention does not utilize adhesively-secured bottom or top corners. As a result, upon the opening of the top of the container along lines of weakness displaced therein, the remainder of the container of the present invention readily collapses into a flat configuration without the need for further handling or cutting of any sort.

U.S. Pat. No. 3,355,089 to Champlin dated Nov. 28, 1967 discloses a box construction formed from a fibrous material and capable of having the top panel thereof readily opened to facilitate access to the contents of the box. The top panel is provided with a plurality of sections which are separated from one another by a plurality of tear scores radiating from near the center of the top of the box to the top corners thereof. In this manner the top of the box can be easily opened; however, unlike the box of the present invention, it cannot be quickly and readily collapsed into a flat configuration due to its design and the use of adhesive to secure the side panels and bottom of the container together.

The invention of Whitney (U.S. Pat. No. 3,447,735) dated Jun. 3, 1969 also discloses an easy-opening container. Like the invention of Champlin, the disclosure of Whitney uses lines of weakness in the top panel of the container. These perforated lines emanate from near the center of the top panel and extend outwards to each of the top four corners of the container. Further like the box of Champlin, but unlike the present invention, the design of the container of Whitney does not permit the container, after use, to be readily collapsed into a flat configuration, in part due to the presence of glued flaps which form and secure the corners of the container.

U.S. Pat. No. 3,542,569 to Farquhar dated Nov. 24, 1970 discloses a carton for holding and displaying a food product. Upon unfastening the top wall and removing the food product the walls of the carton are permitted to fall outwardly and the resulting structure defines a serving tray for the food product. The carton of Farquhar requires that the contents of the carton be removed before it can be unfolded and lay flat. This is due to the presence of overlapped panels in the structure of the carton which engage the food product within the carton. Such food product thus holds the overlapped panels in place and the overlapped panels, secured in such a manner, aid in defining the corners of the carton. In contrast, in the present invention, the container readily collapses without the contents of the container having to be removed first.

Accordingly, the present invention discloses an easy-opening collapsible container of a kind not known in the prior art.

SUMMARY OF THE INVENTION

The cardboard or paperboard containers of the prior art are generally not designed to permit the user to easily collapse the container once the top of the container is opened. The reasons for this are varied. In some instances this was not a desirable feature because the container itself was relied upon to hold or secure the contents of the container when the top was opened. In other instances the container was intended to function as a means for displaying the contents of the container such as in a retail store environment. In those few instances where a collapsible container was desired, the collapsible feature was designed not to function unless and until the contents of the container were removed first. In contrast, the container of the present invention collapses without the contents having to be removed. Thus in the present invention, the top wall of the container is readily opened by hand by means of a fingerhole from which lines of weakness, such as perforations, emanate radially to each of the four corners of the top wall. Upon disassociating each of the four triangular sections which make-up the top wall from each other, the container freely collapses into a flat configuration without any further handling by the user. No cutting instruments of any kind are required to open the top wall of the container. This is of particular importance when opening a container of vinyl floor covering whose surface can be easily marred or scratched by a sharp instrument. Neither is a cutting instrument needed to cut the remnants of the opened container in any fashion in order to cause the remnants of the container to lay flat when opened. This is a significant advantage over other prior art containers. When the contents of a container are heavy and tightly packed together with little room between the contents and the vertical walls of the container, such as in the case of vinyl floor covering tiles, removing the tiles from a prior art container whose top is opened but whose side, front and rear walls remain upright and intact is cumbersome and difficult. With the container of the present invention this problem is solved in that the front, rear and side walls of the container collapse upon the opening of the top wall thus affording ready access to the floor tiles without having to lift them out of the container. Another advantage of the present invention is that the container, when opened, lies flat and is therefore amenable to recycling or disposal in a solid waste receptacle without taking up a significant volume of apace within the receptacle.

Thus, it is one of the objects of this invention to provide a container which is not beset with the aforementioned shortcomings associated with the prior art containers.

It is a further object of the present invention to provide a cardboard or paperboard container which is easily collapsible into a flat configuration when its top wall is opened without the need for cutting or any further handling by the user.

It is a still further object of the present invention to provide a container which can be easily opened without the need for a sharp instrument or a cutting tool.

It is yet another object of the present invention to provide a container which can be easily collapsed into a flat configuration while the contents of the container remain in the container.

In accordance with the foregoing objects, a new container is disclosed. Briefly stated, the invention is practiced by forming the container from a blank of fibrous sheet material such as corrugated cardboard, paperboard, fiberboard or similar material. The container when formed has a top wall, a bottom wall, two side walls, a front wall and a rear wall. The front wall, rear wall and the two sidewalls are foldably connected to the bottom wall. The top wall is foldably connected to the rear wall. Two side extension flaps and one front extension flap are foldably connected to the top wall. These three extension flaps are adhesively secured to the two side walls and the front wall when the container is constructed. Importantly, this is the only adhesive or other securing means used in the construction of the container. A plurality of lines of weakness are provided within the top wall of the container. In the preferred embodiment, four lines of weakness are provided, each line of weakness extending diagonally from a fingerhole located in or near the center of the top wall to each of the four corners of the top wall. The lines of weakness serve as severance lines when an upward force is exerted on the top wall. when such a force is applied the top wall disassociates into four triangular sections which then, along with the side, front and rear walls to which they are attached, are permitted to freely fall outwards and away from the contents of the container. Thus, the contents of the container can be easily accessed and the container itself is now in a flat configuration lending itself to ready recycling or other form of disposal once the contents of the container have been consumed.

Further objects and advantages will be readily apparent to those skilled in the art and a better understanding of the present invention may be had by reference to the following detailed description taken in connection with the following drawings.

DETAILED DESCRIPTION OF THE INVENTION

Figure 1:
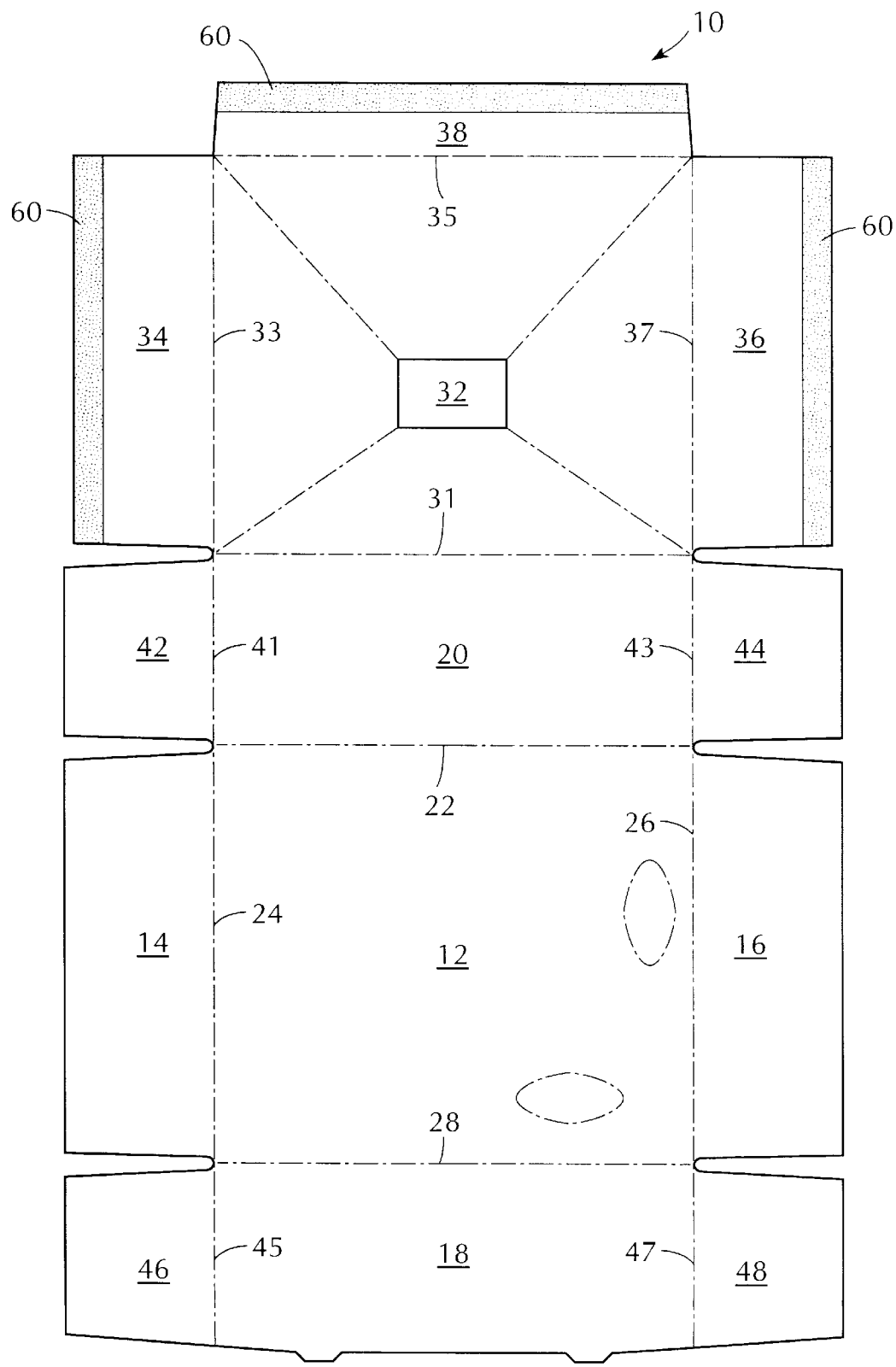
FIG. 1 is a plan view of the blank for the container of the present invention.

Referring now to the drawings and more particularly to FIG. 1, there is shown a flat body blank 10 formed of corrugated cardboard, paperboard, fiberboard or similar material, the gauge and selection thereof depending upon the type and weight of the product to be accommodated within the container. When the product is vinyl floor covering tile 11, the blank 10 is preferably corrugated cardboard. The overall shape of the blank is substantially rectangular and may be readily formed by conventional high speed equipment. The blank 10 is a single piece construction which is suitably cut and scored and adapted to be assembled to define the resulting container 8 of the invention. The blank 10 may be printed with suitable indicia to identify the contents of container 8.

The flat body blank 10 has a bottom wall 12 and two opposed side walls 14, 16 foldably connected thereto along side edge fold lines 24, 26 respectively. Sidewall 14, 16 are of approximately the same dimensions. Front wall 18 is foldably connected to bottom wall 12 along front edge fold line 28. Opposed front wall panels 46, 48 are of approximately the same dimensions and are hinged to front wall 18 along fold lines 45, 47 respectively. Rear wall 20 is of approximately the same dimensions as front wall 18 and is foldably connected to bottom wall 12 along rear edge fold line 22. Opposed rear wall panels 42, 44 are of approximately the same dimensions and are hinged to rear wall 20 along fold lines 41, 43 respectively. Top wall 30 is of approximately the same dimensions as bottom wall 12 and is foldably connected to rear wall 20 along fold line 31. Opposed side extension flaps 34, 36 are of approximately the same dimensions and are connected to top wall 30 along fold lines 33, 37 respectively. Front extension flap 38 is connected to top wall 30 along fold line 35.

Figure 2:
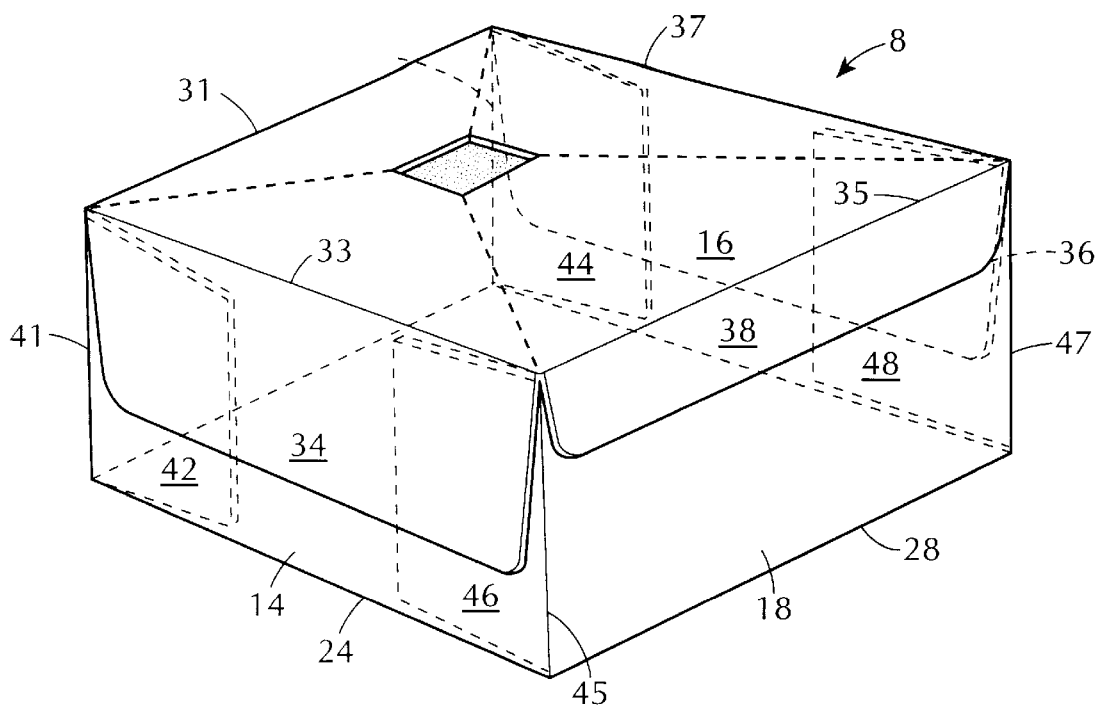
FIG. 2 is a top perspective view of the container formed from the blank of FIG. 1 and shown in a condition for shipment.
Figure 4:
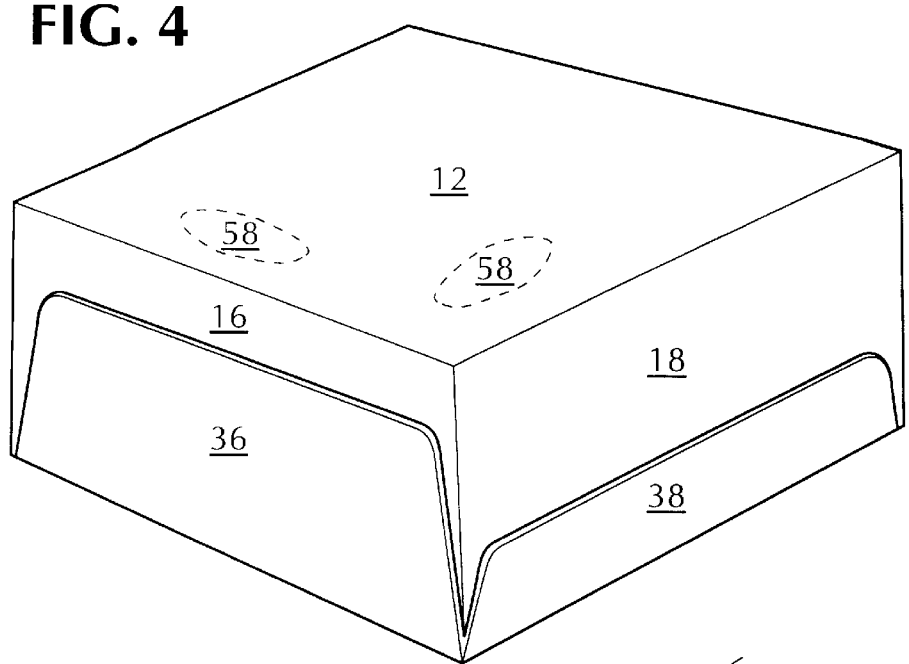
FIG. 4 is a bottom perspective view of the formed container.
Figure 5:
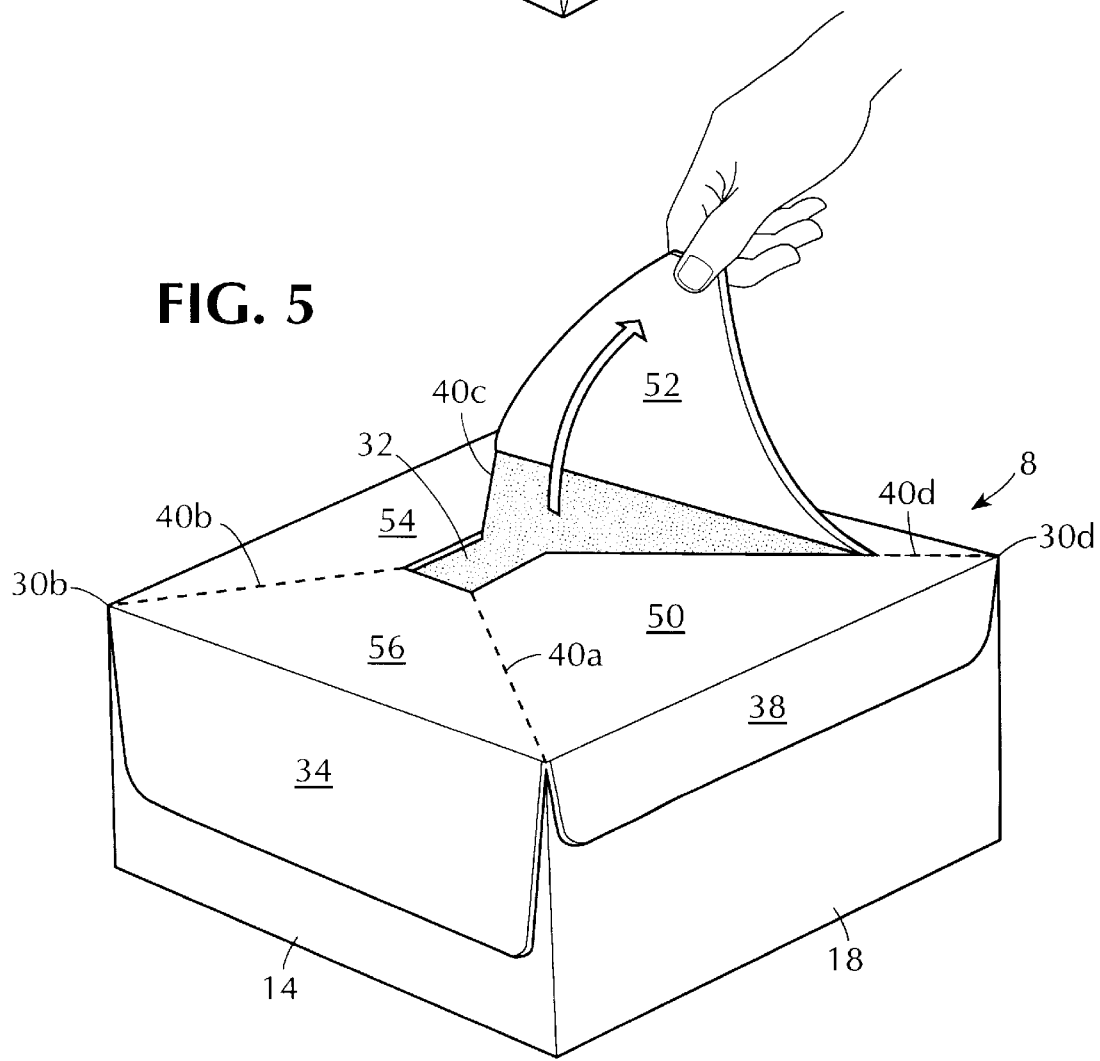
FIG. 5 is a perspective view of the formed container being opened.

Referring to FIGS. 2, 4 and 5, side extension flaps 34, 36 extend outwardly from their associated fold lines 33, 37 a sufficient distance so that they may be adhesively secured to sidewalls 14, 16 respectively as further described below. Similarly, front extension flap 38 extends outwardly from fold line 35 a sufficient distance so that it may be adhesively secured to front wall 18, also as further described below.

Referring now to FIG. 2, there is shown the container 8 of the invention after it has been formed from the flat body blank 10. The size and shape of the container 8 may vary from that shown without departing from the scope of the invention. The illustrated container is a top loading type, that is to say, the products to be accommodated are spotted on the bottom wall 12 of the flat body blank 10 and the container 8 is then erected around the product in the manner hereinafter described.

Figure 3:
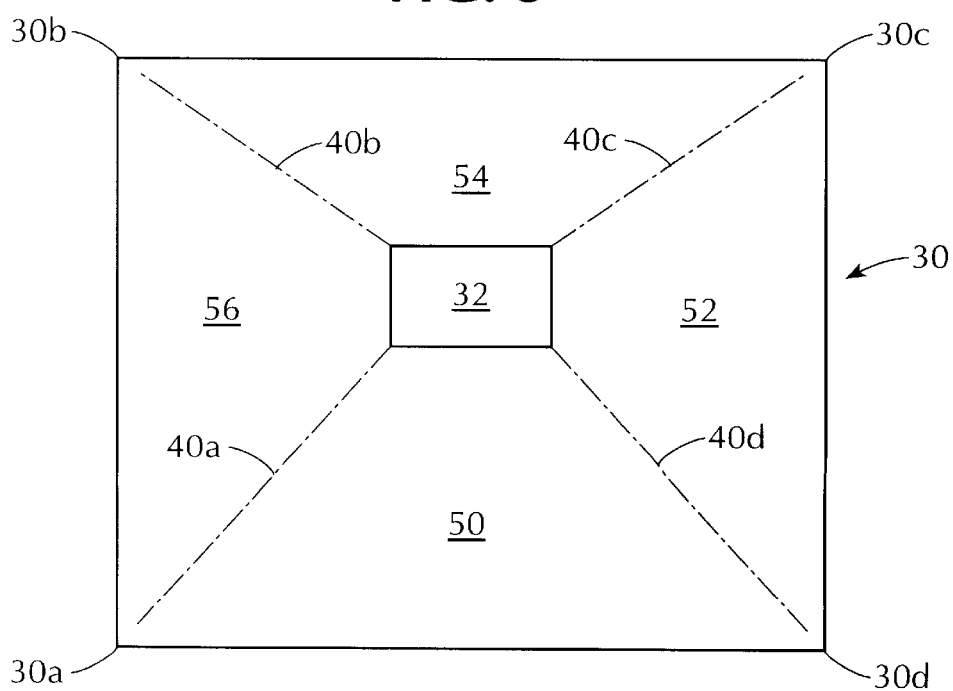
FIG. 3 is a plan view of the of the top wall of the formed container.

Referring to FIG. 3, additional elements of top wall 30 include fingerhole 32, which is located generally at or near the center of the top wall, and lines of weakness 40a,b,c,d extending diagonally outward from fingerhole 32 to corners 30a,b,c,d of top wall 30 thereby forming triangular sections 50, 52, 54, 56 within top wall 30.

Figure 6:
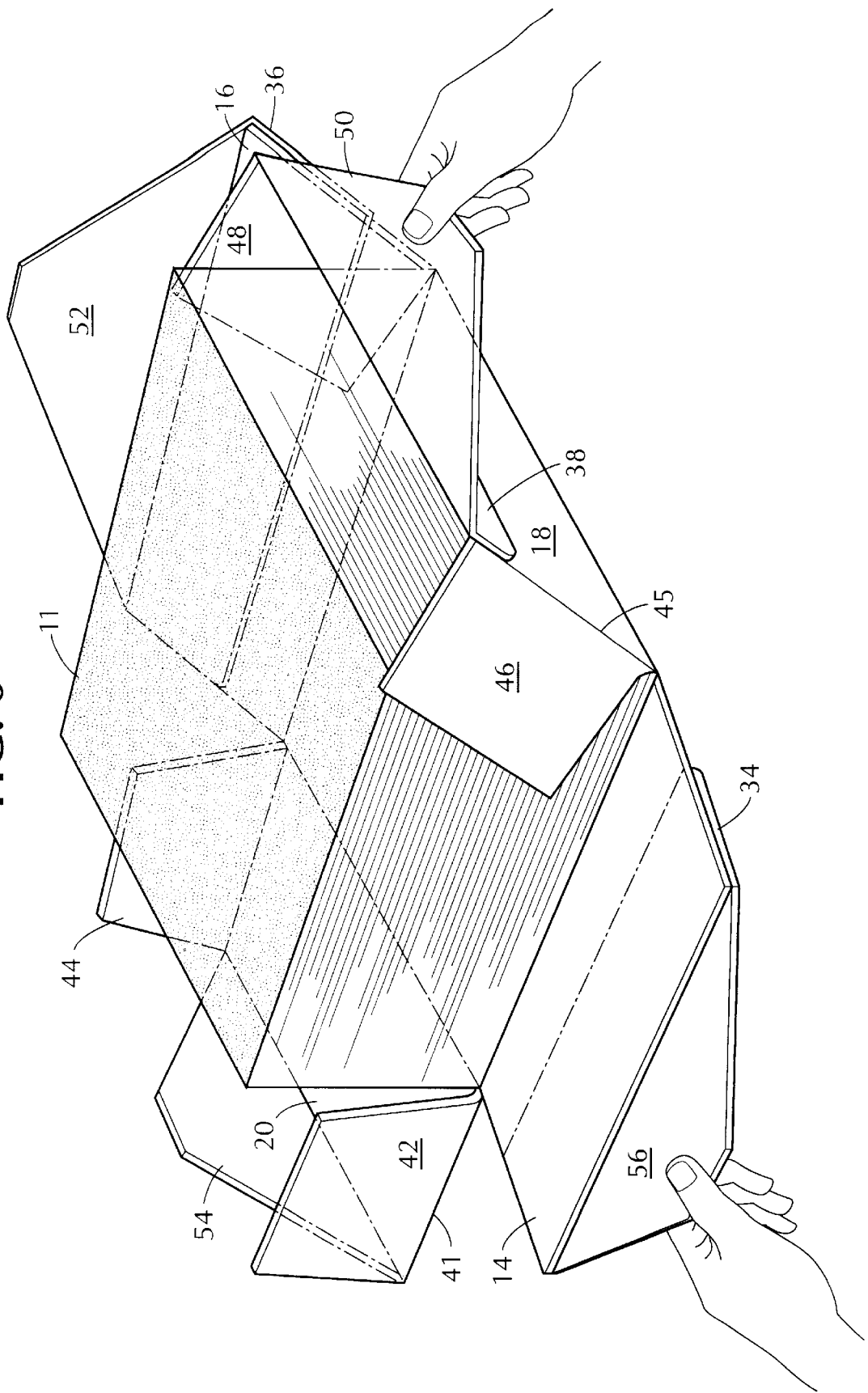
FIG. 6 is a perspective view of the formed container, containing vinyl floor tiles, being collapsed so as to allow it to lie flat.

After spotting the product 11 on the bottom wall 12 of blank 10, sidewalls 14, 16 and front wall 18 are folded upward to be at right angles to bottom wall 12 along side edge fold lines 24, 26 and front edge fold line 28, respectively. Front wall panel 46 is then folded along fold line 45 and oriented in such a manner that front wall panel 46 is in contact with the inside surface of side wall 14, that is, between side wall 14 and the spotted product. Similarly, front wall panel 48 is folded along fold line 47 and oriented to be in contact with the inside surface of side wall 16, that is, between side wall 16 and the product. This relationship is illustrated in FIGS. 2 and 6.

Rear wall 20 is folded upward to be at a right angle to bottom wall 12 along rear edge fold line 22. Rear wall panels 42, 44 are folded along fold lines 41, 43 respectively and oriented in such a manner that rear wall panel 42 is in contact with side wall 14 and rear wall panel 44 is in contact with side wall 16. Importantly, no adhesive or other securing means is provided to attach any of rear wall panels 42, 44 to side walls 14, 16 nor is any adhesive or other securing means used to attach front wall panels 46, 48 to side walls 14, 16. Thus, front wall panels 46, 48 and rear wall panels 42, 44 are not adhesively secured to or interlocked with any portion of the container 8.

Top wall 30 is folded along fold line 31 and oriented so that top wall 30 is parallel to bottom wall 12 with the product thus being disposed between the top wall and the bottom wall. Thereupon front extension flap 38 is folded to be at a right angle to top wall 30 along fold line 35 and disposed in adhesively secured overlapping relation with the outer surface of front wall 18. Side extension flaps 34, 36 are folded to be at right angles to top wall 30 along fold lines 33, 37 respectively, and disposed in adhesively secured overlapping relationship with the outer surface of side walls 14, 16 respectively. In such a manner container 8 is formed from flat body blank 10. The product, now within container 8, does not aid in securing the container in any of its intermediate or final forms.

Any suitable holding means or adhesive may be used to secure front extension flap 38 to front wall 18 and side extension flaps 34, 36 to side walls 14, 16 respectively, thereby holding the container together when it is fully assembled. In this example of the invention a quick drying adhesive is provided and shown as a granular presentation which is designated generally by reference numeral 60 in FIG. 1.

FIG. 3 illustrates top wall 30, lines of weakness 40*a,b,c,d* and corners 30*a,b,c,d*. The lines of weakness provided in the top wall may be in the form of perforations, cut slits, or the like, and may be formed utilizing any suitable technique. Further illustrated is fingerhole 32 which serves a dual purpose. One function of the fingerhole is to permit access for a finger to enter the formed container, apply upward force to top panel 30, and thus open the top panel along the lines of weakness. The fingerhole also permits the observation of the contents of the container, such as the color or texture of vinyl floor covering, without the need to open the container.

In FIG. 4, perforated knockout portions 58 are illustrated. These knockout portions can optionally be removed, thus enabling, for example, an identification number stamped on the bottom of vinyl floor covering tile to be observed without the need for opening the container.

FIGS. 5 and 6 illustrates clearly the manner in which triangular sections 50, 52, 54, 56 may be readily folded back independently of each other so as to cause the container to collapse to a flat configuration thus giving full exposure and access to the contents of the container 8. To collapse the container 8, a finger is inserted through fingerhole 32 and an upward force applied to cause the perforations, for example, forming the lines of weakness 40*a,b,c,d* to tear from fingerhole 32 to each of the four corners 30*a,b,c,d* of top wall 30 thus creating triangular sections 50, 52, 54, 56. Triangular section 50, front extension flap 38 and front panel 18, to which front extension flap 38 is adhesively secured, are thus permitted to fall outward, away from the contents of the container, and lie flat in the same plane as bottom wall 12 while front panel 18 remains connected to bottom wall 12. Similarly, triangular section 52, side extension flap 36 and side panel 16, to which side extension flap 36 is adhesively secured, are permitted to fall outward, away from the contents of the container, and lie flat in the same plane as bottom wall 12 while side wall 16 remains connected to bottom wall 12. In like manner, triangular section 56, side extension flap 34 and side wall 14, to which side extension flap 34 is adhesively secured, are permitted to fall outward and lie flat in the same plane as bottom wall 12 while sidewall 14 remains connected to bottom wall 12. Lastly, triangular section 54, and rear wall 20 to which triangular section 54 is connected, are permitted to fall outward, away from the contents of the container, and lie flat in the same plane as bottom wall 12 while rear wall 20 remains connected to bottom wall 12. That is, opening and/or tearing of the top wall 30 along lines of weakness 40*a,b,c,d* impairs the structural strength of the remainder of the container permitting it to be easily collapsed.

The shape, size and number of sections formed in top wall 30 may readily vary from that shown and still fall within the scope of the invention.

Thus, it is seen that an easy-opening collapsible container and blank therefor have been provided which readily avoid the problems and shortcomings associated with prior containers. A container which is easily opened without damage to its contents and which is fully collapsible has been described. The preferred embodiment has been illustrated and described. Further modifications and improvements may be made thereto as may occur to those skilled in the art and all such changes as fall within the true spirit and scope of this invention are to be included within the scope of the claims to follow.

What is claimed is:

1. An easy-opening collapsible container, formed from a blank of fibrous sheet material, comprising a bottom wall;

a pair of opposed side walls foldably connected to and extending upwards at substantially a right angle from said bottom wall;

a front wall foldably connected to and extending upwards at substantially a right angle from said bottom wall;

a rear wall foldably connected along a rear edge fold line to said bottom wall and foldably connected along an opposed fold line to a top wall, said rear wall folded upwards at substantially a right angle to said bottom wall and said top wall disposed in a substantially parallel relationship to said bottom wall;

a pair of opposed side extension flaps foldably connected to and extending downwards at substantially a right angle from said top wall, said pair of opposed side extension flaps being adhesively secured to said pair of opposed side walls;

a front extension flap foldably connected to and extending downwards at substantially a right angle from said top wall, said front extension flap being adhesively secured to said front wall;

a fingerhole disposed within said top wall; and a plurality of lines of weakness disposed within said top wall and extending from said fingerhole to each corner of said top wall, which lines of weakness function as severance lines when a force is applied to said top wall via said fingerhole such that said top wall disassociates along said lines of weakness and said sidewalls, front wall and rear wall fall outwardly toward the plane of said bottom wall.

2. The container of claim 1 further comprising a pair of opposed rear wall panels foldably connected to said rear wall and a pair of opposed front wall panels foldably connected to said front wall, wherein said front wall panels and said rear wall panels are folded at substantially a right angle to said front wall and said rear wall, respectively, and when folded said front wall panels and said rear wall panels are disposed in a substantially parallel relationship to and between said side walls.

3. The container of claim 1 or claim 2 wherein one or more knockout portions are disposed within said bottom wall.

4. The container of claim 1 or claim 2 wherein said fibrous sheet material is selected from the group consisting of corrugated cardboard, paperboard and fiberboard.

5. A blank being suitably cut and scored from a material and adapted to be assembled to define a resulting easy-opening collapsible container, said blank comprising:

a bottom wall;

a pair of opposed side walls foldably connected to said bottom wall;

a front wall foldably connected to said bottom wall;

a rear wall foldably connected along a rear edge fold line to said bottom wall and foldably connected along an opposed fold line to a top wall;

a pair of opposed side extension flaps foldably connected to said top wall;

a front extension flap foldably connected to said top wall;

a fingerhole disposed in said top wall; and a plurality of lines of weakness extending from said fingerhole to each corner of said top wall;

such that when said container is formed by folding said opposed side walls, said front wall and said rear wall upwards at substantially a right angle to said bottom wall and said top wall is folded to be substantially parallel to said bottom wall with said side extension flaps and said front extension flap folded to be at substantially a right angle to said top wall and said side extension flaps are adhesively secured to said side walls and said front extension flap is adhesively secured to said front wall, a force applied to said lines of weakness through said fingerhole will disassociate said top wall along said lines of weakness and said side walls, front wall and rear wall will fall outwardly toward the plane of said bottom wall.

6. The blank of claim 5 further comprising a pair of opposed rear wall panels foldably connected to said rear wall and a pair of front wall panels foldably connected to said front wall.

7. The blank of claim 5 or claim 6 wherein one or more knockout portions are disposed within said bottom wall.

8. The blank of claim 5 or claim 6 or claim 7 wherein the blank material is selected from the group consisting of cardboard, paperboard and fiberboard.

* * * * *